May 18, 1954   H. H. GATES   2,678,503
SCREW THREAD GAUGE
Filed April 6, 1950   2 Sheets-Sheet 1
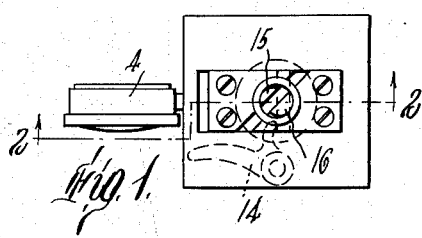
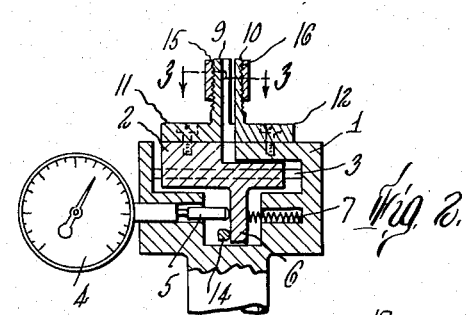
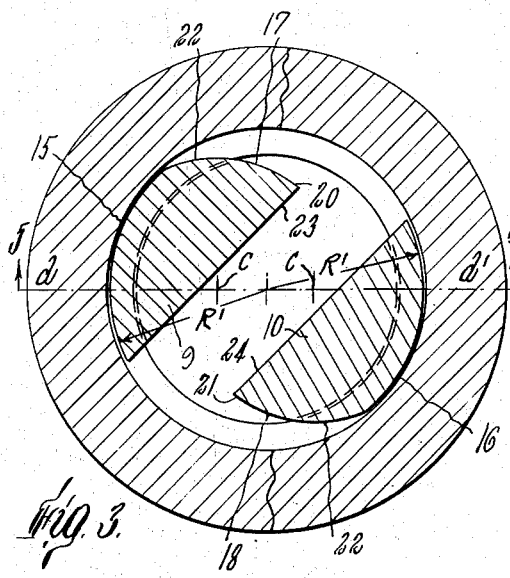
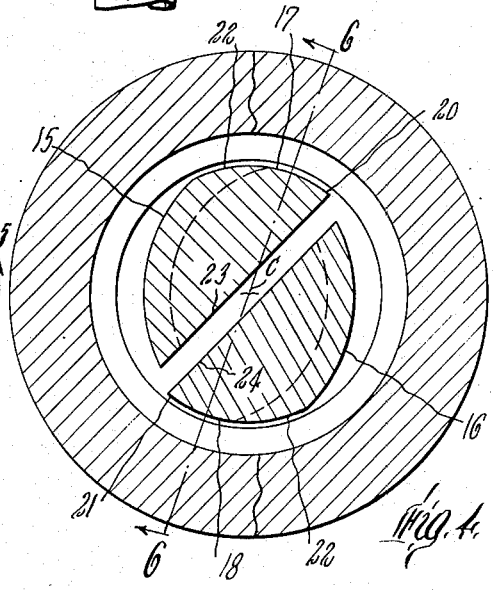
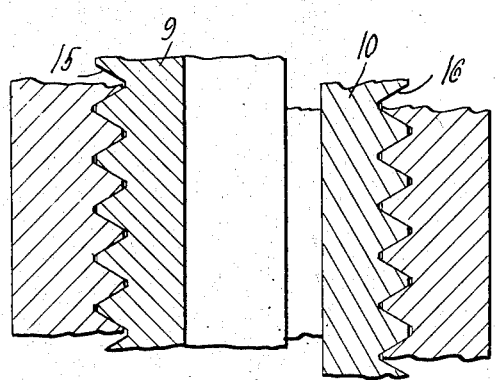
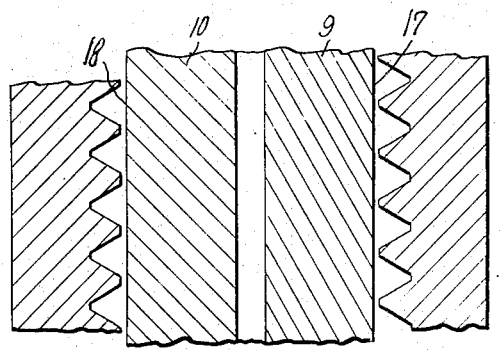
Inventor
Hesslar H. Gates
by Wright Brown Quinby & May
Attys.

May 18, 1954   H. H. GATES   2,678,503
SCREW THREAD GAUGE
Filed April 6, 1950   2 Sheets-Sheet 2
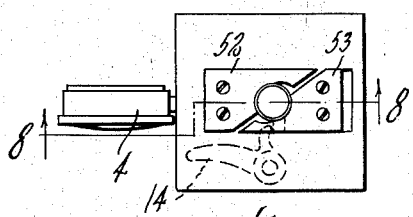
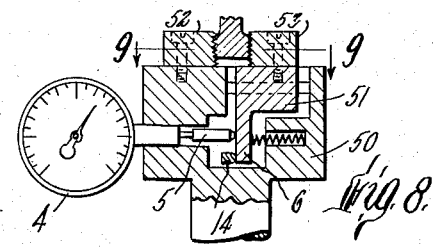
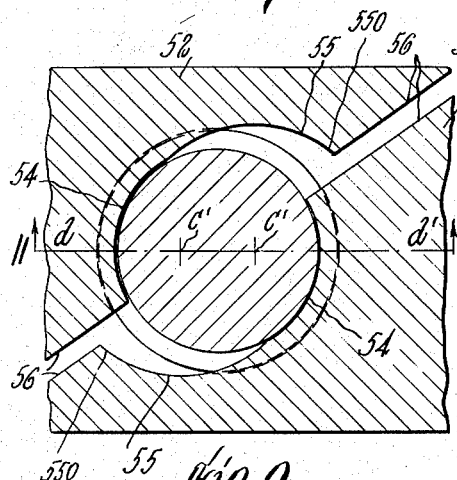
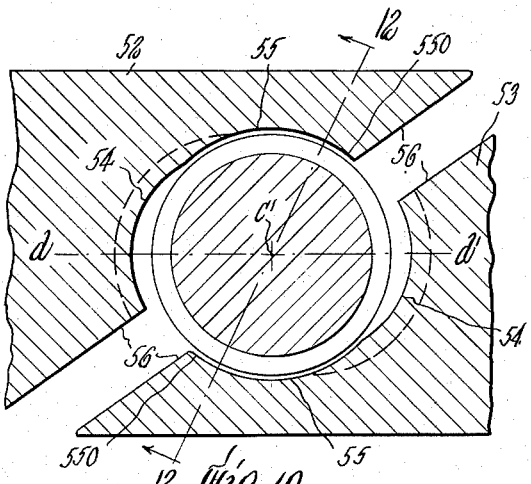
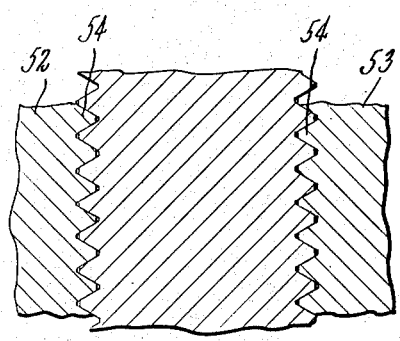
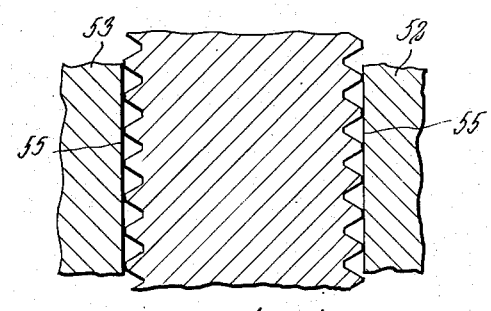
Inventor
Hesslar H. Gates
by Wright Brown Quinby & May
Attys.

Patented May 18, 1954

2,678,503

UNITED STATES PATENT OFFICE 2,678,503

SCREW THREAD GAUGE

Hesslar H. Gates, Charlestown, N. H., assignor to Bryant Chucking Grinder Company, Springfield, Vt., a corporation of Vermont Application April 6, 1950, Serial No. 154,331

4 Claims. (Cl. 33—199)

This invention relates to screw thread gaging, and has for an object to so form the gaging anvils that when they are retracted from engagement with the threads of the work piece they will present smooth portions loosely fitting the threaded work and acting as guides to facilitate the placing or withdrawal of the work with respect to the gage. Thus as applied to a gage for gaging internal threads, these smooth or unthreaded anvil portions will present when the gage is open a smooth guiding portion of slightly less diameter than the internal thread crests of the work piece, while as applied to a gage for external threads, the unthreaded anvil portions, when the gage is open, will present a guiding portion of slightly greater diameter than the external thread crests of the work piece.

For a more complete understanding of this invention, reference may be had to the accompanying drawings in which Figure 1 is a top plan view of an internal thread gage showing an internally threaded ring in gaging position thereon, the thread gaging anvils being constructed in accordance with this invention.

Figure 2 is a view of the upper portion of the gage, the major portion of which is a sectional view on line 2—2 of Figure 1.

Figure 3 is a sectional view to a larger scale on line 3—3 of Figure 2, the gage being closed.

Figure 4 is a view similar to Figure 3, but showing the gage in open condition.

Figure 5 is a detail sectional view on line 5—5 of Figure 3.

Figure 6 is a detail sectional view on line 6—6 of Figure 4.

Figure 7 is a view similar to Figure 1, but showing an externally threaded gage and a work piece.

Figure 8 is a sectional view on line 8—8 of Figure 7.

Figure 9 is a sectional view to a larger scale on line 9—9 of Figure 8, the gage being shown closed.

Figure 10 is a view similar to Figure 9, but showing the gage open.

Figure 11 is a detail sectional view on line 11—11 of Figure 9, and Figure 12 is a detail sectional view on line 12—12 of Figure 10.

Referring first to Figures 1 to 6, the invention is shown as embodied in an internal thread gage. As shown in Figures 1 and 2, the gage may comprise a pair of members 1 and 2 which are mounted for relative motion transversely to the axis of the work to be gaged, and, as shown, this motion is rectilinear. For this purpose the member 2 is provided with portions engaging in parallel ways, one of which is shown at 3 in the member 1, the member 2 thus being mounted for rectilinear movement on the member 1.

A dial indicator 4 is carried by the supporting or fixed member 1 and its actuating stem 5 bears against an extension 6 from the movable member 2. A spring 7 engaging this extension 6 and reacting between it and a portion of the member 1 presses this extension 6 against the stem 5 of the indicator and tends to separate stud portions 9 and 10 of a pair of gaging anvils 11 and 12 which are secured to the members 2 and 1, respectively. A finger lever 14 may be actuated to retract the movable member against the spring 7 and open the gage. These stud portions have externally threaded arcuate portions 15 and 16 which are pressed into engagement with the threads of the work piece when the gage is closed thereon. These arcuate portions 15 and 16 are each of a radius equal to or slightly less than that of the corresponding portions of the threads of a standard work piece and when a standard work piece is in gaging position, these arcuate portions 15 and 16 properly engage the threads of this work piece as shown in Figure 5, and the dial indicator is then adjusted for zero. The indication of the dial indicator when a work piece to be tested is being gaged will then give an indication of whether or not the work piece is of the proper size.

Adjacent to one edge of each of the arcuate portions 15 and 16 are second arcuate portions 17 and 18, these second arcuate portions being on the two anvils in the same direction angularly, that is, as shown in Figure 3, the portion 17 is in clockwise relation to the gaging portion 15 and similarly the arcuate portion 18 is in clockwise angular relation to the gaging face 16. These arcuate portions 17 and 18, however, are arcs of smaller radius than those for the gaging surfaces 15 and 16. For example, the maximum radius for the gaging arcuate portions 15 and 16 is shown at $R^1$ in Figure 3, the center of curvature being in a diameter $d-d^1$, which passes through both of these arcs and which lies in the direction of relative motion of the anvils when they are moved between open and closed positions. The radii of the arcuate portions 17 and 18 are equal and are somewhat less than the radius of the internal thread crests of a standard work piece, and they are struck from centers which when the anvils are in gaging position, as shown in Figure 3, are at $c$, both of these centers lying substantially in the same diameter $d$—$d^1$ along which the anvils are moved relatively in changing from gaging to open position. When the anvils are moved to open position these centers $c$ move toward each other along the diameter $d$—$d^1$ until when they coincide, as shown in Figure 4, they are at the central axis of the standard work piece. The arcs 17 and 18 then form portions of the circumference of a circle of slightly less diameter than the internal crests of the standard work piece, providing a clearance therebetween as is clearly shown in Figures 4 and 6. These arcuate portions 17 and 18 are mainly smooth, although at their junctures with the arcuate portions 15 and 16, the threads of the latter portions intersect. Each of the anvils therefore has an essentially unthreaded concave portion, the curvature of which is described about an axis substantially parallel to the axis of curvature of the threaded portion and intersects it so that it lies in the same planes transverse to the axes therewith. These unthreaded portions may act as smooth guides to facilitate the placing and removal of the work piece with respect to the gage. This is shown, for example, in Figure 6.

However, in view of the fact that the threads of the arcuate portions 15 and 16 do intersect the adjacent ends of the arcuate portions 17 and 18 and might therefore be engaged by the threads of the work piece and prevent free sliding motion, it is preferable to move the gaging anvils relatively in opening direction somewhat beyond the position shown in Figure 4 so that the end portions 20 and 21 of the arcuate portions 17 and 18 are spaced slightly wider than the portions 22 which contain thread grooves but not greater than the internal diameter of the thread crests of the work piece, and become the guiding portions engaged by the work piece, these portions 20 and 21 being removed from the threaded portions. This action avoids any necessity for relieving the surfaces of the arcuate portions 17 and 18 at 22 which are interrupted by thread grooves of the gaging portions 15 and 16. The remote ends of the arcuate portions 15—17, and 16—18 are connected by chords 23 and 24 which are substantially parallel and may be at any desired angle between the limits of 0° and 90° to the diameter $d$—$d^1$ and they are sufficiently spaced to permit the desired opening motion of the anvils, the portions 15—17 and 16—18 each being somewhat less than a semi-circumference. An angle of approximately 45° for these chords 23 and 24 will usually be found quite satisfactory.

In Figures 7 to 12 the arrangement of the anvils is shown for external gaging. Referring to these figures, a relatively stationary member 50 carries slidable thereon the movable member 51 which as an extension 6 bearing upon the stem 5 of the dial indicator 4, this dial indicator being carried by the stationary member 50. External gaging anvils 52 and 53 are carried by the fixed and movable members 50 and 51, respectively. Each of these anvils has an arcuate portion 54 which is internally threaded to mate the threads of a standard plug, and these internally threaded gaging portions are in position to approach and recede from each other as the movable anvil is moved between gaging and open positions along the diameter $d$—$d^1$. Each of these anvils is also provided with a second arcuate portion 55. This portion is described about a center $c^1$ lying substantially in the diameter $d$—$d^1$ and of a radius slightly greater than the maximum radius of a standard threaded plug which is the maximum diameter of the thread crests.

When the anvils are moved to the open position shown in Figures 10 and 12 so as to retract the arcuate portions 54 from the gaging relation to the threaded plug shown in Figures 9 and 11, these centers $c^1$ come together so that the arcuate portions 55 are concentric with and spaced slightly outwardly of a work piece so that these arcuate portions 55 serve as portions of a smooth walled opening and act as guides facilitating the placing and removal of the work piece. These arcuate portions 55 are unthreaded but where they approach the gaging arcuate faces 54, they are intersected by the threads thereof. Here, also in order to avoid any chance of these intersecting portions interfering with the smooth guiding action, and also to avoid any necessity of relieving the gaging anvils at these points, preferably the opening action is allowed to proceed somewhat beyond the position shown in Figures 10 and 12 where the centers $c^1$ coincide, whereupon the extremities 550 of the arcuate portions 55 remote from the gaging arcuate portions 54 are brought further toward the surface of the work piece and produce the guiding action while the portions more remote therefrom and toward the gaging portions 54 are moved away from the work piece so that interference with the free relative motion between the gage and work piece is avoided. Here again, also, the remote ends of the arcs 54—55 lie in chords 56 substantially parallel to each other and arranged at a suitable angle between 0° and 90° to the diameter $d$—$d^1$, each arc 54—55 together being sufficiently less than a semi-circumference to allow the necessary motion of the anvils to full closed position.

While, as shown, the relative opening and closing motions of the anvils is rectilinear, this motion may depart somewhat from this. For instance, it may be arcuate, without requiring any changes over the construction shown, ordinarily such arcuate motion being on such a relatively long radius that it departs little from rectilinear motion.

From the foregoing description it will be seen that this invention provides for threaded gaging portions on the anvils and for unthreaded guiding portions facilitating the placing or removal of the work, but which do not interfere in any way with the gaging action of the threaded gaging portions.

It will also be evident that it is not essential that each gaging portion or each guiding portion be continuous along an arc so long as a sufficient area be provided to gage or to facilitate the guiding action.

Claims generic to internal and external gages shown herein, and claims specific to the internal gage are contained in my application Serial No. 187,777 filed September 30, 1950, for Screw Thread Gage, which application is a continuation-in-part of this application.

From the foregoing description of certain embodiments of this invention it will be evident to those skilled in the art that various further changes and modifications may be made without departing from its spirit or scope.

I claim:

1. A thread gage for external work comprising a pair of gaging anvils for engaging externally of the work, said anvils being mounted for relative motion toward and from each other, each of said anvils having an internally threaded arcuate portion the curvature of which is that of the threaded face of a standard threaded plug of corresponding size, said threaded anvil portions being moved toward gaging relation when said anvils are moved relatively toward each other, each of said anvils having an essentially unthreaded concave portion intersecting said threaded arcuate portion and having an axis of curvature substantially parallel to the axis of curvature of said threaded arcuate portion having a curvature of a radius slightly larger than the radius of curvature of the thread crests of said standard plug and movable toward concentric relation thereto when said anvils are moved away from closed toward open position to define with each other a substantially smooth walled opening into and out of guiding relation to which a threaded work piece to be gaged may be moved into and out of gaging relation to said gage.

2. An external thread gage comprising a pair of anvils each having a pair of intersecting concave arcuate portions in adjacent zones described about substantially parallel axes, and both together in each anvil defining less than a semi-circumference, one of said arcuate portions of each anvil having a radius of curvature equal to that of a standard threaded plug for that particular gage and internally threaded to mate the threads of said standard plug, the other of said arcuate side portions of each anvil being mainly smooth and of a radius slightly greater than the radius of curvature of the thread crests of said standard plug, said gaging anvils being mounted for relative motion toward and from each other substantially along a diameter common to the threaded arcuate side portions of both anvils, the centers of curvature of the others of said portions lying substantially in said diameter and when said anvils are in open position said other portions being spaced greater than the diameter of the thread crests of said standard plug.

3. An external thread gage comprising a pair of anvils each having a pair of intersecting concave arcuate portions in adjacent zones described about substantially parallel axes, and both together in each anvil defining less than a semi-circumference, one of said arcuate portions of each anvil having a radius of curvature equal to that of a standard threaded plug for that particular gage and internally threaded to mate the threads of said standard plug, the other of said arcuate side portions of each anvil being mainly smooth and of a radius slightly greater than the radius of curvature of the thread crests of said standard plug, said gaging anvils being mounted for relative motion toward and from each other substantially along a diameter common to the threaded arcuate side portions of both anvils, the centers of curvature of the others of said faces lying substantially in said diameter and when said anvils are in open position said other faces being spaced greater than the diameter of the thread crests of said standard plug, said pair of intersecting arcuate portions of each anvil terminating in a chord arranged at an angle between the limits of 0° and 90° to said diameter and defining a side face of each anvil, said chords of the two anvil members of the pair being substantially parallel.

4. An external thread gage comprising a pair of anvils each having a pair of intersecting concave arcuate portions in adjacent zones described about substantially parallel axes, and both together in each anvil defining less than a semi-circumference, one of said arcuate portions of each anvil having a radius of curvature equal to that of a standard threaded plug for that particular gage and internally threaded to mate the threads of said standard plug, the other of said arcuate side portions of each anvil being mainly smooth and of a radius slightly greater than the radius of curvature of the thread crests of said standard plug, said gaging anvils being mounted for relative motion toward and from each other substantially along a diameter common to the threaded arcuate side portions of both anvils, the centers of curvature of the others of said faces lying substantially in said diameter and when said anvils are in open position said other faces being spaced greater than the diameter of the thread crests of said standard plug, said pair of intersecting arcuate portions of each anvil terminating in a chord arranged at an angle of approximately 45° to said diameter and defining a side face of each anvil, said chords of the two anvil members of the pair being substantially parallel.

References Cited in the file of this patent

UNITED STATES PATENTS

| Number | Name | Date |
|---|---|---|
| 1,337,018 | Lockey et al. | Apr. 13, 1920 |
| 1,625,462 | Frauenthal | Apr. 19, 1927 |
| 1,630,690 | Bosle et al. | May 31, 1927 |
| 1,898,133 | Leibe | Feb. 21, 1933 |
| 1,905,705 | Hartness | Apr. 25, 1933 |
| 2,363,077 | Moore | Nov. 21, 1944 |
| 2,427,924 | Rose | Sept. 23, 1947 |